(12) United States Patent
Sakano et al.

(10) Patent No.: US 7,648,791 B2
(45) Date of Patent: Jan. 19, 2010

(54) FUEL CELL AND CELL FASTENING PINS

(75) Inventors: Masaaki Sakano, Utsunomiya (JP);
Narutoshi Sugita, Utsunomiya (JP);
Ryugo Suzuki, Nishiibaraki-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 719 days.

(21) Appl. No.: 11/274,830

(22) Filed: Nov. 14, 2005

(65) Prior Publication Data
US 2006/0110643 A1 May 25, 2006

(30) Foreign Application Priority Data
Nov. 24, 2004 (JP) ............................ P2004-338974

(51) Int. Cl.
*H01M 8/24* (2006.01)
*F16B 19/00* (2006.01)
(52) U.S. Cl. ........................................ 429/34; 411/508
(58) Field of Classification Search ................ 411/502, 411/508, 509; 429/32, 34
See application file for complete search history.

(56) References Cited

U.S. PATENT DOCUMENTS

| | | | | | |
|---|---|---|---|---|---|
| 2,529,420 | A | * | 11/1950 | Ramquist | 411/509 X |
| 3,565,693 | A | * | 2/1971 | Tapsell | 429/34 |
| 3,905,270 | A | * | 9/1975 | Hehl | 411/509 |
| 6,209,178 | B1 | * | 4/2001 | Wiese et al. | 411/508 X |
| 6,526,634 | B1 | * | 3/2003 | Hsieh | 411/508 X |
| 6,878,476 | B2 | * | 4/2005 | DeAngelis et al. | 429/34 |
| 2006/0088752 | A1 | | 4/2006 | Sakano | 429/34 |
| 2006/0110643 | A1 | | 5/2006 | Sakano | 429/30 |
| 2008/0268319 | A1 | * | 10/2008 | Sakano et al. | 429/34 |

FOREIGN PATENT DOCUMENTS

| | | |
|---|---|---|
| JP | 2000-12067 | 1/2000 |
| JP | 2001-338673 | 12/2001 |
| JP | 2004-172094 | 6/2004 |
| JP | 2004-241208 | 8/2004 |

OTHER PUBLICATIONS

Office action from corresponding Japanese patent application No. 2004-338974, dated Jun. 16, 2009 (and English-language translation thereof).

* cited by examiner

*Primary Examiner*—Stephen J. Kalafut
(74) *Attorney, Agent, or Firm*—Fish & Richardson P.C.

(57) ABSTRACT

A fuel cell has a unit cell in which a membrane electrode assembly, in which a pair of electrodes are provided on either side of an electrolyte membrane, is provided between a first separator and a second separator. Pin insertion holes are respectively provided in a plurality of portions in an outer periphery of each of the first and the second separators, and the pin insertion holes of the first separators are respectively coaxial with those of the second separator. A leg portion of a cell fastening pin made of resin is inserted through each pair of the coaxial pin insertion holes of the first and the second separators. The unit cell is fastened by fitting a flange portion formed at an end of the leg portion to the first separator, and fitting a hook portion formed at the other end of the leg portion to the second separator.

6 Claims, 7 Drawing Sheets

FUEL CELL AND CELL FASTENING PINS

BACKGROUND OF THE INVENTION

1. Field of the Invention

The present invention relates to a fuel cell and cell fastening pins for fastening elements of a unit cell which is a constituent of the fuel cell.

Priority is claimed on Japanese Patent Application No. 2004-338974, filed Nov. 24, 2004, the content of which is incorporated herein by reference.

2. Description of the Related Art

In a known fuel cell, an anode and a cathode are provided on either side of a solid polymer electrolyte membrane so as to form a membrane electrode assembly. The membrane electrode assembly is placed between separators which are provided so as to form a unit cell. Generally, a specific number of unit cells are stacked to form a fuel cell stack.

In consideration of easy handling, working convenience, productivity, or the like for the above kind of fuel cell, in each unit cell, the membrane electrode assembly and the separators on either side thereof may be fastened together so as to prevent separation of each element of the unit cell.

For example, Japanese Unexamined Patent Application, First Publication No. 2004-241208 discloses a technique in which a plurality of parts in a periphery of each unit cell are clipped together using elastic metal clips having a U-shaped section.

However, in the above case of fastening and forming a unit cell using the elastic clips, each elastic clip must be attached to the periphery of the unit cell while opening the mouth of the clip in opposition to an elastic force, which requires a special jig or tool. Therefore, this process is inconvenient and requires an additional cost, thereby increasing the manufacturing cost.

In addition, weight saving of elastic metal clips has a limit. In particular, when tens to hundreds of unit cells are stacked so as to form a fuel cell stack, the total weight of the elastic clips is large, which prevents weight saving of the fuel cell stack.

SUMMARY OF THE INVENTION

In light of the above circumstances, an object of the present invention is to provide a fuel cell having a fastening structure enabling weight saving of the fuel cell and easy fastening operation, and to provide a cell fastening pin used for fastening the elements of each unit cell.

Therefore, the present invention provides a fuel cell having a unit cell (e.g., a unit cell 50, 50A, or 50B in an embodiment explained later), wherein:

in the unit cell, a membrane electrode assembly (e.g., a membrane electrode assembly 54 in the embodiment), in which a pair of electrodes (e.g., an anode 52 and a cathode 53 in the embodiment) are provided on either side of an electrolyte membrane (e.g., a solid polymer electrolyte membrane 51 in the embodiment), is provided between a first separator (e.g., a cathode separator 56 in the embodiment) and a second separator (e.g., an anode separator 55 in the embodiment);

pin insertion holes (e.g., pin insertion holes 63a and 64a, or pin insertion holes 63b and 64b in the embodiment) are respectively provided in a plurality of portions in an outer periphery of each of the first and the second separators, and the pin insertion holes of the first separators are respectively coaxial with the pin insertion holes of the second separator;

a leg portion (e.g., a leg portion 11 in the embodiment) of a cell fastening pin (e.g., a cell fastening pin 10 in the embodiment) made of resin is inserted through each pair of the coaxial pin insertion holes of the first and the second separators; and the unit cell is fastened by fitting a flange portion (e.g., a flange portion 12 in the embodiment) formed at an end of the leg portion to the first separator, and fitting a hook portion (e.g., a hook portion 13 in the embodiment) formed at the other end of the leg portion to the second separator.

According to the above structure, the first and the second separators and the membrane electrode assembly can be fastened by the cell fastening pins made of resin, thereby reducing the weight of the fuel cell.

The fuel cell may have a pair of the unit cells (e.g., unit cells 50A and 50B in the embodiment) which are stacked, wherein the cell fastening pins mounted into one of the unit cells are arranged at positions different from positions where the cell fastening pins mounted into the other unit cell are arranged. Accordingly, when the unit cells are stacked, it is possible to prevent the cell fastening pins attached to one of the unit cells and the cell fastening pins attached to the other unit cell from overlapping with each other.

In this case, it is possible that:

the pin insertion holes (e.g., pin insertion holes 64a and 64b in the embodiment) of the first separator have diameters larger than diameters of the corresponding pin insertion holes (e.g., pin insertion holes 63a and 63b in the embodiment) of the second separator, and the leg portion of each cell fastening pin has a larger-diameter portion (e.g., a larger-diameter portion 11a in the embodiment) having a larger diameter in comparison with the remaining portion, wherein the larger-diameter portion is formed next to the flange portion and is contained in the pin insertion hole of the first separator through which the cell fastening pin is inserted.

According to this structure, a head portion of each cell fastening pin of one of the stacked unit cells can enter the pin insertion hole of the first separator of the other unit cell; thus, it is possible to prevent the cell fastening pins of the one of the stacked unit cells from interfering with the other unit cell. In addition, the operator can easily distinguish the first separator and the second separator from each other at a glance by comparing the sizes of the pin insertion holes of the first and the second separators, thereby preventing an erroneous combination of the first and the second separators when forming the unit cell. Furthermore, each cell fastening pin is inserted from the corresponding pin insertion hole having a larger diameter of the first separator; thus, the pin insertion hole can guide the cell fastening pin, thereby improving working convenience.

In this case, it is possible that:

for each insertion hole of each separator, another pin insertion hole having the same form is provided so as to form a pair of the pin insertion holes;

in one of the unit cells, each cell fastening pin is mounted into the pin insertion hole (e.g., a pin insertion hole 63a or 64a in the embodiment) on one side of each pair, and in the other unit cell, each cell fastening pin is mounted into the pin insertion hole (e.g., a pin insertion hole 63b or 64b in the embodiment) on the other side of each pair.

According to the above structure, when the unit cells are stacked, the hook portion of each cell fastening pin, which protrudes from one of the unit cells, can enter the pin insertion hole at a corresponding position of the first separator of the other unit cell. Therefore, the length of the fuel cell in the stacking direction can be reduced, thereby reducing the size of the fuel cell. In addition, the first and the second separators of the fastened unit cell can be easily distinguished at a glance by comparing the sizes of the pin insertion holes where no cell fastening pin is mounted. Accordingly, when a plurality of the unit cells (each being fastened) are stacked, it is possible to reliably prevent an erroneous stacking state such that separators of the same electrode are adjacent to each other. Furthermore, each of the first and the second separators can be a common part for both unit cells. Accordingly, the kinds of parts can be reduced and the parts can be easily managed, thereby improving productivity.

In a preferable example, the leg portion of each cell fastening pin is divided into a plurality of leg sections in a circumferential direction of the leg portion; and the hook portion is also divided into a plurality of portions, each provided at an end of each leg section.

The present invention also provides a cell fastening pin used in the fuel cell as described above, comprising:

a pin main portion (e.g., a pin main portion 21 in the embodiment) including the leg portion, the flange portion, and the hook portion; and a handle (e.g., a handle 22 in the embodiment) joined to the flange portion.

According to the above structure, the cell fastening pin can be handled by grasping the handle, thereby improving handling performance in an operation of stacking the unit cells and improving productivity.

In this case, it is possible that:

the cell fastening pin is formed by injection molding;

the handle includes a gate portion (e.g., a gate portion 23 in the embodiment) which is joined to the flange portion; and after the unit cell is fastened, the handle and the pin main portion are cut off at the gate portion.

Accordingly, the pin main portion and the handle can be integrally molded in a single process.

Typically, the gate portion has a diameter smaller than diameters of the flange portion and the other portions of the handle.

Accordingly, after the unit cell is fastened, each gate portion can be easily broken by a shearing force and only the cell fastening pin can remain in the unit cell.

DETAILED DESCRIPTION OF THE INVENTION

Hereinafter, embodiments of a fuel cell and a cell fastening pin according to the present invention will be described with reference to the appended figures (i.e., FIGS. 1 to 10).

Figure 1:
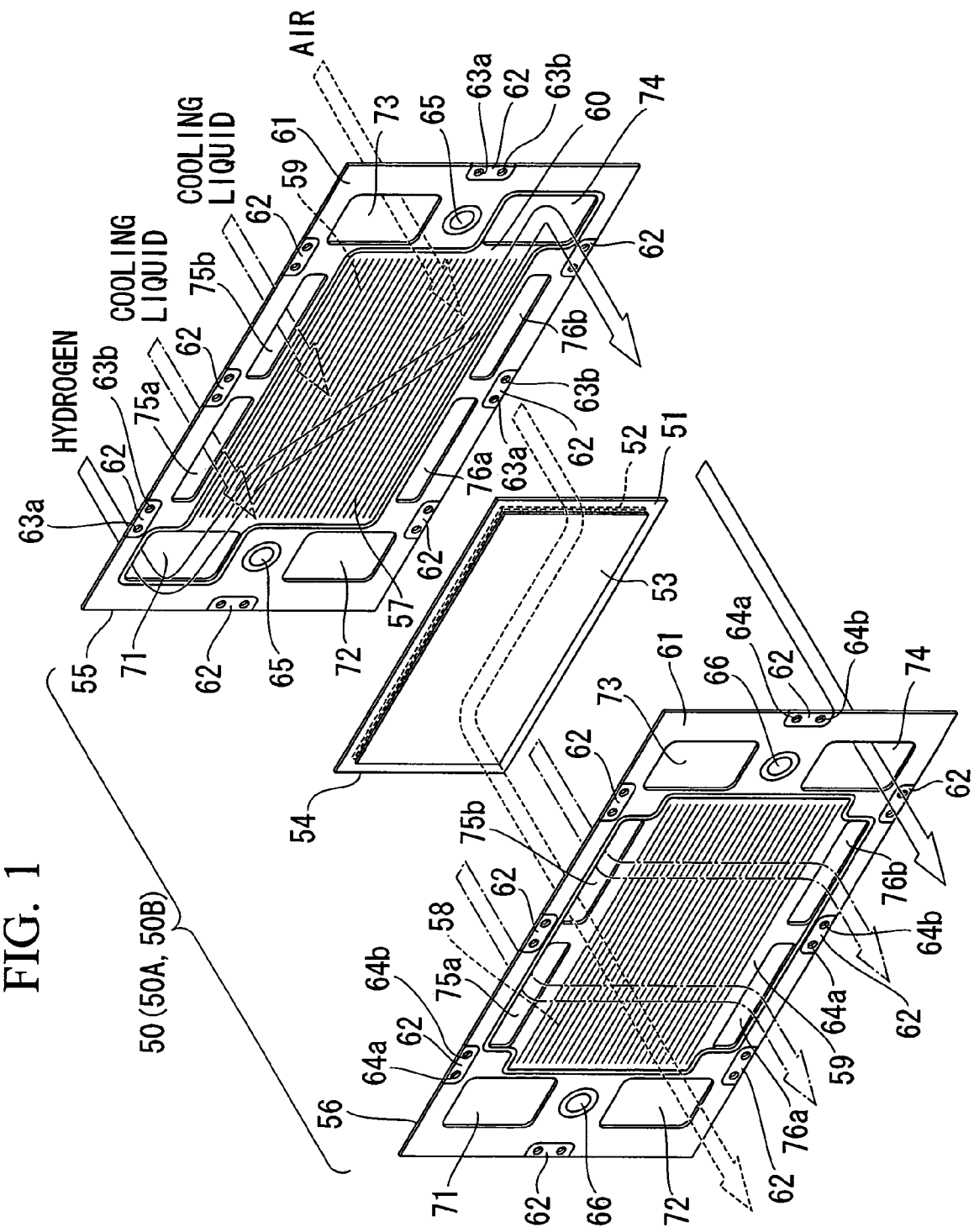
FIG. 1 is an exploded perspective view showing a unit cell of the fuel cell as an embodiment of the present invention.

FIG. 1 is an exploded perspective view showing a unit cell of the fuel cell as an embodiment of the present invention. The fuel cell in the present embodiment is a solid polymer electrolyte membrane type. As shown in FIG. 1, an anode 52 (i.e., an electrode) and a cathode 53 (i.e., another electrode) are provided on either side of a solid polymer electrolyte membrane 51 (made of a fluorine electrolyte material or the like) so as to form a membrane electrode assembly 54. The membrane electrode assembly 54 is closely placed between an anode separator 55 (corresponding to a second separator in the present invention) and a cathode separator 56 (corresponding to a first separator in the present invention) so as to form a unit cell 50 (i.e., a unit fuel cell). A plurality of the unit cells 50 are stacked to obtain a fuel cell stack. In order to improve handling performance or the like in an operation of stacking the unit cells 50 and assembling a fuel cell stack, each unit cell 50 is subjected to a fastening process to finish the unit cell as a unit. The fastening structure of the unit cell 50 will be explained later in detail.

Each of the separators 55 and 56 is molded as a specific form by press-molding a metal plate 60. A metal separator can be thinner than a separator made of carbon, so that the dimension in the stacking direction in which the unit cells are stacked can be smaller.

The anode separator 55 is positioned so as to face the anode 52, and in a face of the anode separator 56, which faces the anode 52, a fuel cell passage 57 is provided. The cathode separator 56 is positioned so as to face the cathode 53, and in a face of the cathode separator 56, which faces the cathode 53, an air passage 58 is provided. After a plurality of the unit cells 50 are stacked, a refrigerant passage 59, through which a cooling liquid or fluid passes, is formed between the separators 55 and 56 of adjacent unit cells. The fuel cell passage 57, the air passage 58, and the refrigerant passage 59 are each formed in an area corresponding to the areas of the anode 52 and the cathode 53 of the membrane electrode assembly 54.

In each of the separators 55 and 56, openings 71 and 72 are respectively provided in an upper portion and a lower portion on one side, and openings 73 and 74 are respectively provided in an upper portion and a lower portion on the other side. Additionally, in each of the separators 55 and 56, a pair of openings 75a and 75b are formed side by side in a center portion of an upper end portion of the separator. Similarly, a pair of openings 75a and 75b are formed side by side in a center portion of a lower end portion of each separator. The openings 71, 72, 73, and 74 respectively function as a fuel cell supply opening, an air discharge opening, an air supply opening, and a fuel cell discharge opening. The openings 75a and 75b function as refrigerant supply openings, and the openings 75a and 75b function as refrigerant discharge openings.

On either face of each of the separators 55 and 56, a seal layer 61 made of an insulating resin (e.g., a silicone resin) is integrally attached, for example, by molding.

In the anode separator 55, the seal layer 61, provided on the face which faces the anode 52, surrounds the fuel cell passage 57 in a manner such that the fuel cell passage 57 communicates with the fuel cell supply opening 71 and the fuel cell discharge opening 74. Similarly, in the cathode separator 56, the seal layer 61, provided on the face which faces the cathode 53, surrounds the air passage 58 in a manner such that the air passage 58 communicates with the air supply opening 73 and the air discharge opening 72.

In each of the anode separator 55 and the cathode separator 56, the seal layer 61, provided on the face which does not face the membrane electrode assembly 54, surrounds the refrigerant passage 59 in a manner such that the refrigerant passage 59 communicates with the refrigerant supply openings 75a and 75b, and the refrigerant discharge openings 75a and 76b.

After the membrane electrode assembly 54 and the separators 55 and 56 are assembled as a unit (i.e., the unit cell 50) and a plurality of the unit cells 50 are stacked so as to form a fuel cell stack, the openings 71 to 74, 75a, 75b, 76a, and 75b of each separator respectively communicate with the corresponding openings 71 to 74, 75a, 75b, 76a, and 75b of the adjacent separator(s), thereby forming distribution and collection passages.

More specifically, (i) the fuel cell supply openings 71, which communicate with each other, form a fuel cell distribution passage, (ii) the air discharge openings 72, which communicate with each other, form an air collection passage, (iii) the air supply openings 73, which communicate with each other, form an air distribution passage, (iv) the fuel cell discharge openings 74, which communicate with each other, form a fuel cell collection passage, (v) the refrigerant supply openings 75a and 75b, which respectively communicate with the refrigerant supply openings 75a and 75b, form refrigerant distribution passages, and (vi) the refrigerant discharge openings 75a and 76b, which respectively communicate with the refrigerant discharge openings 75a and 76b, form refrigerant collection passages.

In each unit cell 50, hydrogen gas as a fuel gas is supplied from the fuel cell distribution passage to the fuel cell passage 57 via the fuel cell supply opening 71. The supplied gas flows through the fuel cell passage 57 from the left to the right side in FIG. 1, and then the gas is discharged via the fuel cell discharge opening 74 to the fuel cell collection passage.

In each unit cell 50, air (including oxygen) as an oxidant gas is supplied from the air distribution passage to the air passage 58 via the air supply opening 73. The supplied air flows through the air passage 58 from the right to the left side in FIG. 1, and then air is discharged via the air discharge opening 72 to the air collection passage.

Also in each unit cell 50, the cooling liquid is supplied from the refrigerant distribution passages to the refrigerant passage 59 via the refrigerant supply openings 75a and 75b. The supplied cooling liquid flows through the refrigerant passage 59 from the upper to the lower side in FIG. 1, and the cooling liquid is discharged via the refrigerant discharge openings 75a and 75b to the refrigerant collection passage.

In each unit cell 50 having the above structure, hydrogen ions, generated at the anode 52 by catalytic reaction, pass through the solid polymer electrolyte membrane 51 and move to the cathode 53, so that an electrochemical reaction between the hydrogen ions and oxygen occurs at the cathode 53, thereby generating electric power and water. In order to prevent the operating temperature of the unit cell 50 from exceeding a specific value due to heat generated by the electric power generation, the cooling liquid, which flows through the refrigerant passage 59, is used for removing the heat.

Below, the fastening structure for the unit cell 50 will be explained.

Each of the separators 55 and 56 has a plurality of fastening bases 62 formed in the periphery of the separator. Each fastening base 62 is provided by closing a notch formed in a peripheral edge of the metal plate 60 with an insulating resin. Specifically, the fastening base 62 may be molded using an insulating resin in advance and fastened to the notch of the metal plate 60 by an appropriate means such as cramping or adhesion, or may be molded by injecting an insulating resin toward the notch of the metal plate 60.

In the present embodiment, eight fastening bases 62 are provided in each of the separators 55 and 56. Among the eight fastening bases 62, two are respectively provided at the center of both sides (i.e., of the left and right sides), three are provided in the upper edge, and the other three are provided in the lower edge. Every fastening base 62 is positioned between any two adjacent ones of the openings 71 to 74, 75a, 75b, 76a, and 76b, In each fastening base 62 of the anode separator 55, a pair of pin insertion holes 63a and 63b is provided. The pin insertion holes 63a and 63b are separated along the outer periphery of the separator 55, and have the same diameter. Similarly, in each fastening base 62 of the cathode separator 56, a pair of pin insertion holes 64a and 64b is provided, which are separated along the outer periphery of the separator 56, and have the same diameter.

Figure 2:
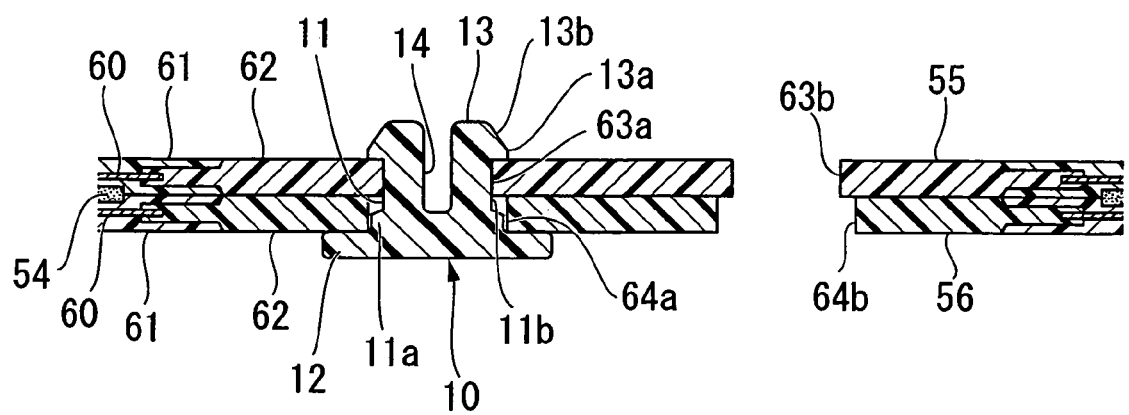
FIG. 2 is a sectional view along line II-II in FIG. 3.
Figure 3:
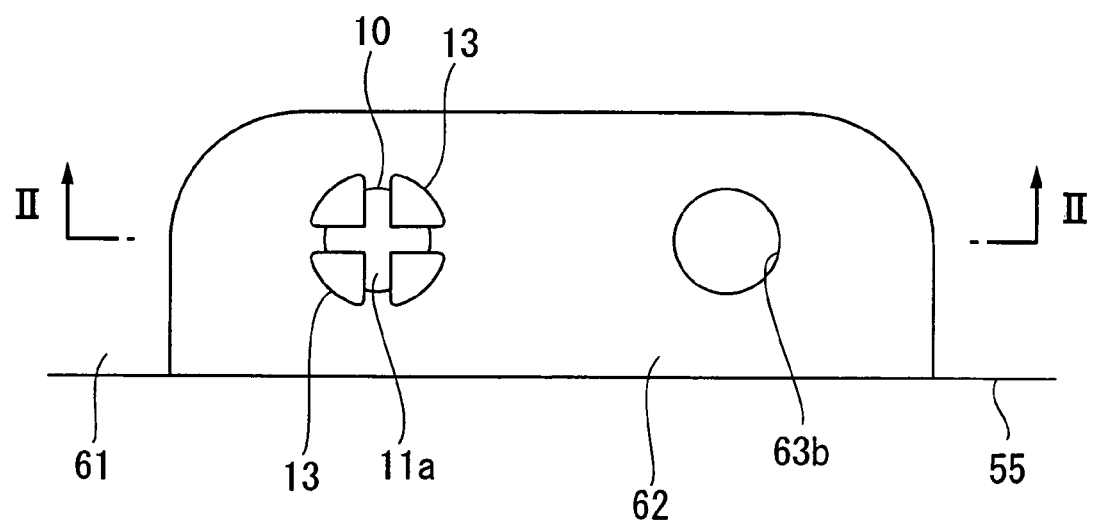
FIG. 3 is a back view of a fastening portion of the unit cell.
Figure 4:
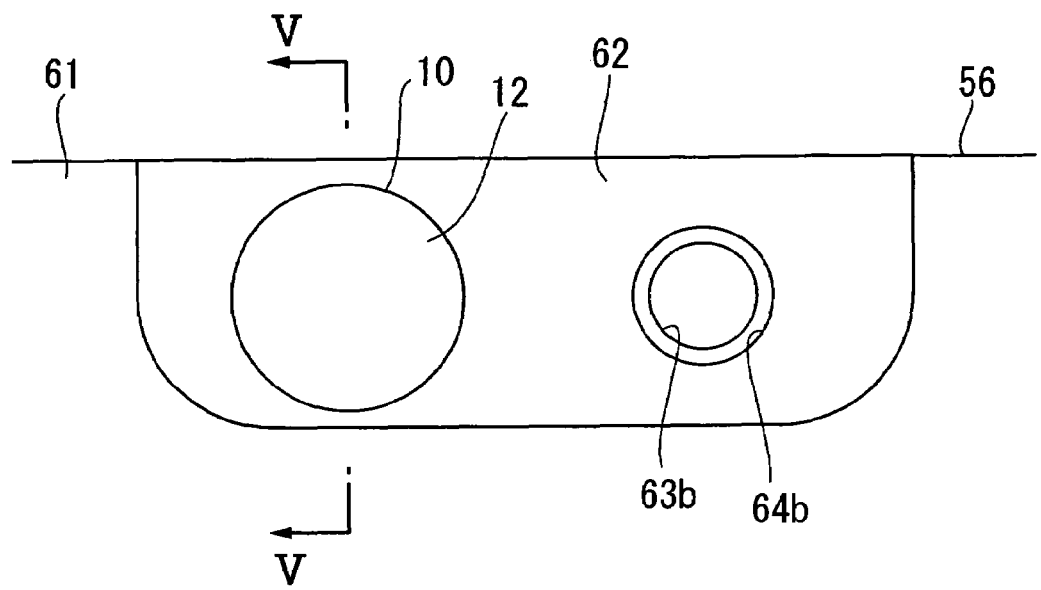
FIG. 4 is a front view of the fastening portion.
Figure 5:
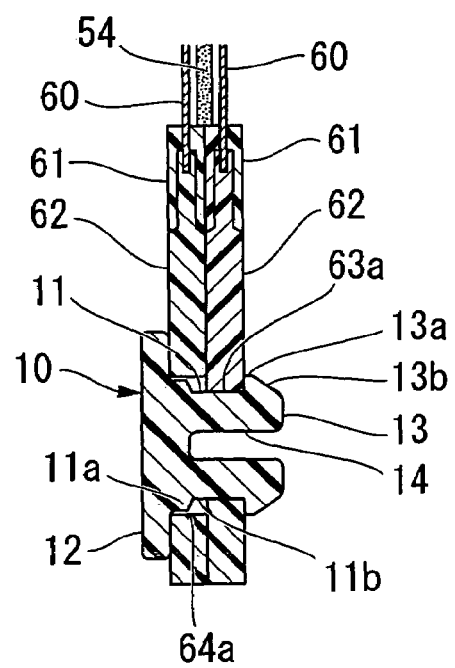
FIG. 5 is a sectional view along line V-V in FIG. 4.

FIGS. 3 and 4 are respectively a back view and a front view of a fastening portion (including the fastening base 62) of the unit cell 50. FIG. 2 is a sectional view along line II-II in FIG. 3, and FIG. 5 is a sectional view along line V-V in FIG. 4. As shown in FIGS. 2 and 5, the inner diameter of the pin insertion holes 64a and 64b of the cathode separator 56 is larger than that of the pin insertion holes 63a and 63b of the anode separator 55.

The pin insertion hole 63a of the anode separator 55 and the pin insertion hole 64a of the cathode separator 56 (which are called the A-side pin insertion holes 63a and 64a for convenience of explanations) are coaxially arranged when the unit cell 50 is assembled. Similarly, the pin insertion hole 63b of the anode separator 55 and the pin insertion hole 64b of the cathode separator 56 (which are called the B-side pin insertion holes 63b and 64b for convenience of explanations) are coaxially arranged when the unit cell 50 is assembled. In other words, the A-side pin insertion holes 63a and 64a are coaxially arranged through the separators 55 and 56, and the B-side pin insertion holes 63b and 64b are also coaxially arranged through the separators 55 and 56. In each fastening base 62, the above-described seal layer 61 is formed only along a periphery joined to the metal plate 60, that is, no seals such as seal layers 61 are provided around the pin insertion holes 63a, 63b, 64a, and 64b (see FIGS. 2 and 5, or the like).

The anode separator 55 and the cathode separator 56 on either side of the membrane electrode assembly 54 are inseparably fastened to each other by (i) engaging protruding and recessed fitting portions 65 and 66 (respectively provided in the separators 55 and 56 for positioning) with each other, and (ii) attaching a cell fastening pin 10 made of resin to one of the A-side pin insertion holes 63a and 64a and the B-side pin insertion holes 63b and 64b provided in each pair of the fastening bases 62 (which face each other), thereby forming a unit as the unit cell 50. In comparison with a case of fastening the elements of the unit cell 50 using metal fastening members, the present case using the cell fastening pins 10 made of resin can reduce the weight of the unit cell 50.

Regarding the selection between the A-side and the B-side pin insertion holes into which the cell fastening pin 10 is inserted, one of the A-side and the B-side pin insertion holes is assigned to each cell unit 50 in advance. In the following explanations, the unit cell 50 in which a cell fastening pin 10 is inserted into the A-side pin insertion holes 63a and 64a of every fastening base 62 is called an A-type unit cell 50A, and the unit cell 50 in which a cell fastening pin 10 is inserted into the B-side pin insertion holes 63b and 64b of every fastening base 62 is called a B-type unit cell 50B.

The following explanations relate to the A-type unit cell 50A; however, the B-type unit cell 50B has substantially the same structure.

As shown in FIGS. 2 to 5, the cell fastening pin 10 has (i) a leg portion 11 inserted through the pin insertion holes 63a and 64a of the separators 55 and 56, (ii) a flange portion 12 which is formed at an end of the leg portion 11 and has a diameter larger than that of the leg portion 11, and (iii) a hook portion 13 formed at the other end of the leg portion 11. The leg portion 11 consists of a larger-diameter portion 11a which connects with the flange portion 12, and a smaller-diameter portion 11b which is closer to the hook portion 13 in comparison with the larger-diameter portion 11a and has a diameter smaller than that of the larger-diameter portion 11a. The smaller-diameter portion 11b is divided into four portions in the circumferential direction over the whole length, and thus consists of four leg sections 14. The hook portion 13 is provided at the end of each leg section 14. Each hook portion 13 has a fitting portion 13a which expands from the leg section 14 toward the outside in the radial direction, and a tapered portion 13b in which the further it is from the fitting portion 13a, the smaller the diameter.

The outer diameter of the larger-diameter portion 11a is slightly smaller than the inner diameter of the pin insertion hole 64a of the cathode separator 56 and is larger than the inner diameter of the pin insertion hole 63a of the anode separator 55. In addition, the length of the larger-diameter portion 11a in the axial direction (i.e., the thickness of this portion) is smaller than the thickness of the fastening base 62 of the cathode separator 56. Accordingly, the larger-diameter portion 11a is contained in the pin insertion hole 64a of the fastening base 62 of the cathode separator 56.

The outer diameter of the smaller-diameter portion 11b is determined in consideration that the smaller-diameter portion 11b can be fit to the pin insertion hole 63a substantially without a gap between this portion and the hole.

The outer diameter of the head of the tapered portion 13b is slightly smaller than the inner diameter of the pin insertion hole 63a of the anode separator 55.

In a state in which the cell fastening pin 10 is inserted into the pin insertion holes 63a and 64b, (i) the flange portion 12 is fit to a surface of the cathode separator 56, (ii) the larger-diameter portion 11a is contained in the pin insertion hole 64a of the cathode separator 56, (iii) the smaller-diameter portion 11b is inserted in the pin insertion holes 63a and 64a of the anode and the cathode separators 55 and 56, and (iv) the hook portion 13 is fit to a surface of the anode separator 55, thereby fastening the anode and the cathode separators 55 and 56 to each other. In this fastened state, the seal layers 61 of the anode and the cathode separators 55 and 56, which face each other, tightly contact each other, and simultaneously, the fastening bases 62 of the separators 55 and 56 also tightly contact each other.

Figure 6:
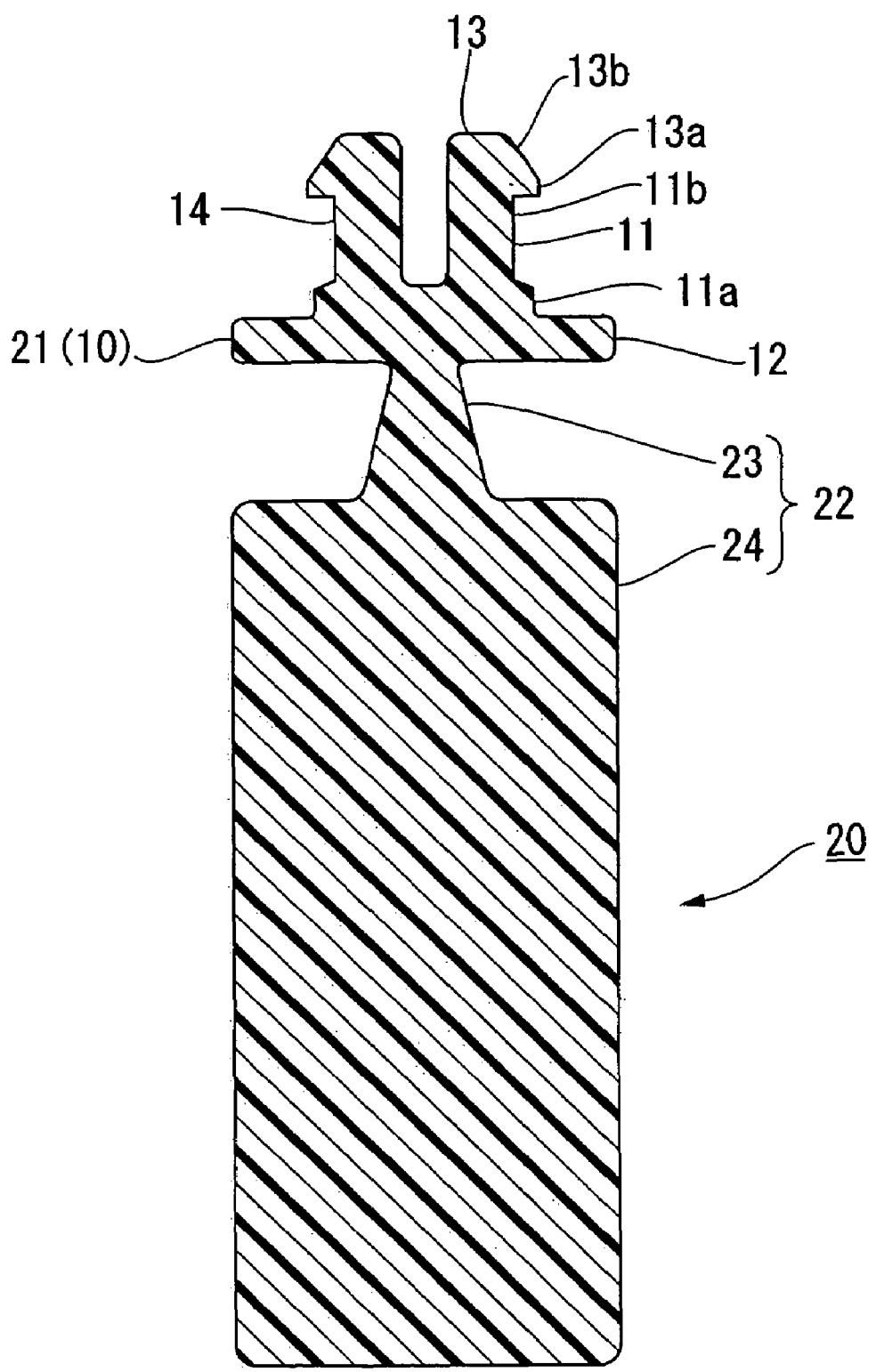
FIG. 6 is a sectional view showing a form of the cell fastening pin immediately after injection molding.

The cell fastening pin 10 is formed by injection molding, and FIG. 6 shows a form (called a pin molded body 20) immediately after the injection molding (i.e., before the pin is mounted into the unit cell 50). The pin molded body 20 consists of a pin main portion 21 for forming the leg portion 11, the flange portion 12, and the hook portion 13 of the cell fastening pin 10, and a handle 22 joined to the flange portion 12 of the pin main portion 21. The handle 22 consists of a gate portion 23 joined to the pin main portion 21, and a stump portion 24 joined to the gate portion 23. The gate portion 23 is a portion which functions as a gate for increasing the flow rate of fused resin when the injection molding is performed. The stump portion 24 is a portion which functions in the injection molding as a resin storage for supplying fused resin to a cavity and applying a pressure to the cavity until the resin is cured. Therefore, in the gate portion 23, the end which is joined to the pin main portion 21 has a very small diameter. In addition, the stump portion 24 must secure a specific capacity; thus, the axial length thereof is considerably longer than that of the pin main portion 21 while the outer diameter of the stump portion 24 is almost the same as that of the pin main portion 21. As the pin molded body 20 is formed by injection molding, the pin main portion 21 and the handle 22 can be integrally molded in a single process.

Below, the process of fastening the separators 55 and 56 using the cell fastening pins 10 will be explained with reference to FIGS. 7 and 8, which are diagrams for explaining the process.

The shown pin molded body 20 keeps the form as shown in FIG. 6 until the pin molded body 20 is mounted into the unit cell 50. In the fastening process, the stump portion 24 (or the handle 22) having a long axial length in the pin molded body 20 is handled. More specifically, in a manual operation, the stump portion 24 is held by hand, and in a mechanical operation, the stump portion 24 is grasped by a chuck of a specific mechanism. Accordingly, the pin molded body 20 can be handled very easily.

Figure 7:
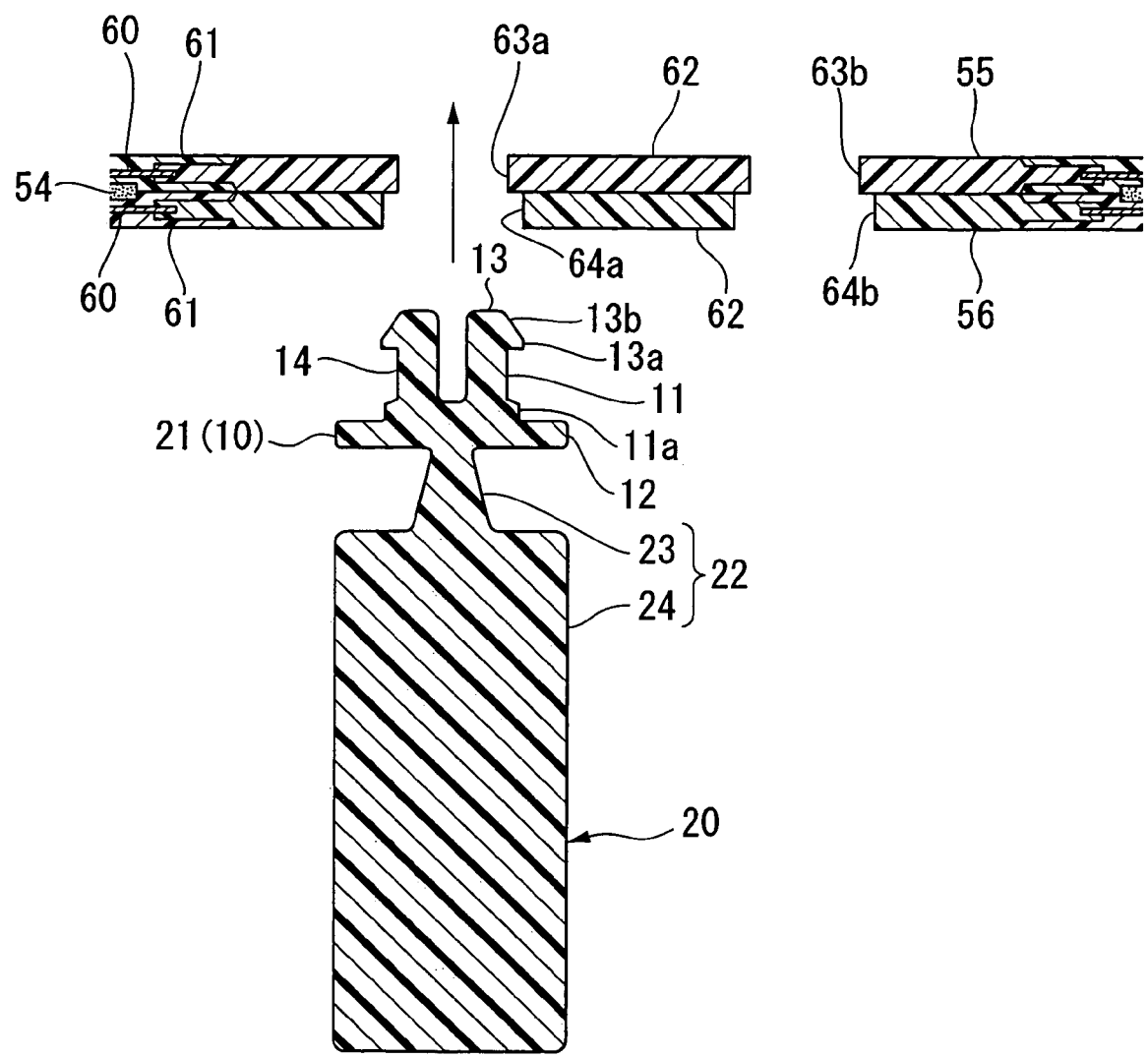
FIG. 7 is a diagram explaining the process of fastening the unit cell in the embodiment.
Figure 8:
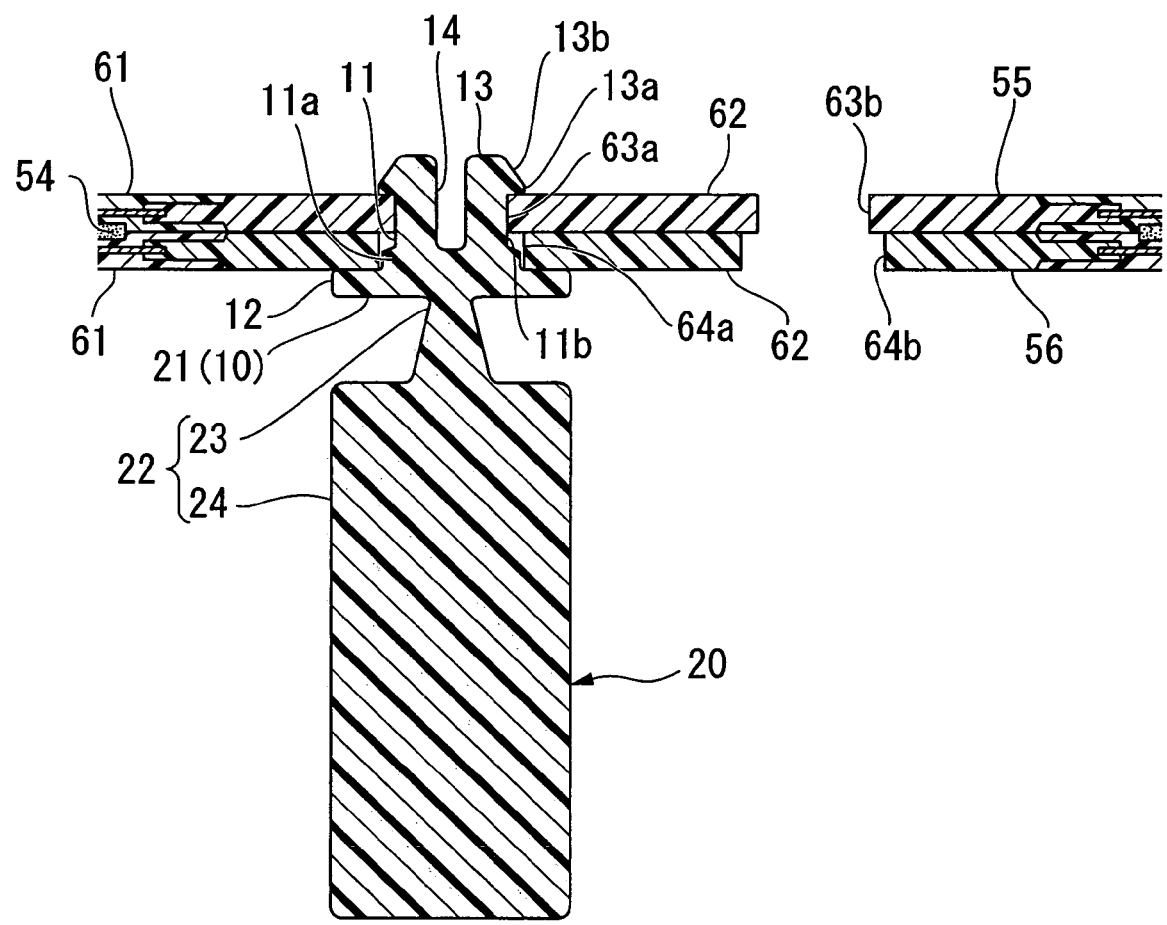
FIG. 8 is another diagram explaining the process of fastening the unit cell in the embodiment.

First, as shown in FIG. 7, the anode separator 55 and the cathode separator 56 are set on either side of the membrane electrode assembly 54 while engaging the protruding and recessed fitting portions 65 and 66 with each other. Here, the inner diameters of the pin insertion holes 63a and 63b of the anode separator 55 are smaller than the inner diameters of the pin insertion holes 64a and 64b of the cathode separator 56. Therefore, the operator can distinguish the anode separator 55 and the cathode separator 56 from each other only by glancing at the pin insertion holes, thereby preventing an erroneous combination of the separators 55 and 56.

The pin molded body 20 is positioned in a manner such that the pin molded body 20 faces the cathode separator 56 of the set body of the separators 55 and 56. The pin molded body 20 is then pushed straight into the pin insertion hole 64a of the cathode separator 56.

Accordingly, the hook portions 13 of the cell fastening pin 10 proceed along the pin insertion hole 64a of the cathode separator 56, and the tapered portion 13b of each hook portion 13 makes contact with an opening edge of the pin insertion hole 63a of the anode separator 55. According to a guiding function of each tapered portion 13b, the smaller-diameter portion 11b of the leg portion 11 enters the pin insertion hole 63a while the diameter of the elastic smaller-diameter portion 11b is reduced. After that, the larger-diameter portion 11a of the cell fastening pin 10 enters the pin insertion hole 64a of the cathode separator 56. After the hook portions 13 pass through the pin insertion hole 63a, the diameter of the elastic smaller-diameter portion 11b is returned to a normal dimension, and as shown in FIG. 8, the hook portions 13 are fit to a surface of the fastening base 62 of the anode separator 55. Simultaneously, the flange portion 12 of the cell fastening pin 10 is fit to a surface of the fastening base 62 of the cathode separator 56.

In the next step, the gate portion 23 is broken and the handle 22 is removed. Accordingly, as shown in FIGS. 2 and 5, only the cell fastening pin 10 remains while the separators 55 and 56 are fastened to each other. As described above, in the gate portion 23, the end which is joined to the pin main portion 21 has a very small diameter. Therefore, this end portion can be easily broken by a small shearing force generated by bending or twisting this portion.

In the present embodiment, the outer diameter of the larger-diameter portion 11a is larger than the inner diameter of the pin insertion hole 63a of the anode separator 55. Therefore, when the separators 55 and 56 are fastened to each other, the pin molded body 20 cannot be inserted from the anode separator 55 side. Accordingly, in the unit cell 50 after the fastening process, it is possible to recognize at a glance that the side where the flange portion 12 protrudes is the cathode separator 56, and that the side where the hook portion 13 protrudes is the anode separator 55. The anode separator 55 and the cathode separator 56 can also be distinguished at a glance by comparing the inner diameters of the pin insertion holes 63b and 64b where no cell fastening pin 10 is mounted. Accordingly, when a plurality of the unit cells 50 are stacked, it is possible to reliably prevent an erroneous stacking state such that separators of the same electrode (i.e., the anode or the cathode) are adjacent to each other. In addition, the separators 55 and the 56 can be quickly distinguished from each other; thus, the operation of stacking the unit cells 50A and 50B can be quickly performed, thereby improving the productivity.

Figure 9:
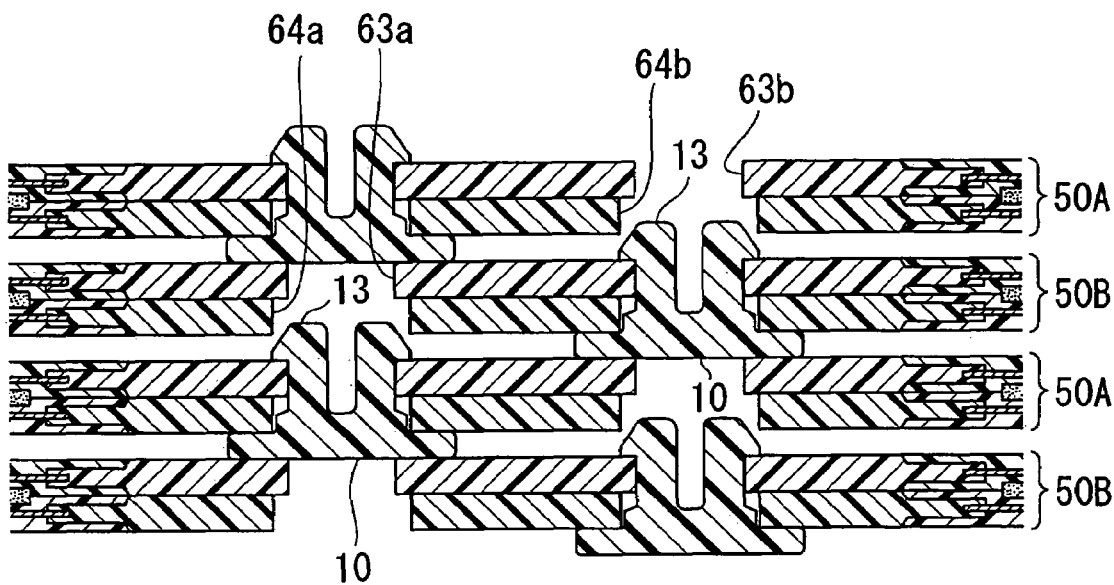
FIG. 9 is a sectional view showing fastened portions in a fuel cell stack consisting of the stacked unit cells in the embodiment.

FIG. 9 is a sectional view showing fastened portions in a fuel cell stack consisting of the stacked unit cells 50 which are fastened using the cell fastening pins 10. As shown in FIG. 9, the A-type unit cell 50A in which the cell fastening pins 10 are inserted into the A-side pin insertion holes 63a and 64a in every fastening base 62 and the B-type unit cell 50A in which the cell fastening pins 10 are inserted into the B-side pin insertion holes 63b and 64b in every fastening base 62 are alternately stacked. Accordingly, the cell fastening pins 10 attached to the A-type unit cells 50A and the cell fastening pins 10 attached to the B-type unit cells 50B can be arranged at different positions in the in-plane direction of the unit cells 50A and 50B.

Therefore, it is possible to prevent the cell fastening pins 10 attached to the A-type unit cells 50A and the cell fastening pins 10 attached to the B-type unit cells 50B from overlapping with each other. In particular, in the present embodiment, the hook portions 13 of each cell fastening pin 10 mounted into the A-type unit cells 50A enter the pin insertion hole 64a of the cathode separator 56 of the B-type unit cells 50B, and the hook portions 13 of each cell fastening pin 10 mounted into the B-type unit cells 50B enter the pin insertion hole 64b of the cathode separator 56 of the A-type unit cells 50A. Therefore, in the stacked state, it is possible to prevent the hook portions 13 from interfering with the adjacent unit cell 50. As a result, the length of the fuel cell stack in the stacking direction can be reduced, thereby reducing the size of the fuel cell stack.

In addition, the cell fastening pin 10 is made of resin; thus, the weight of the fuel cell stack can be smaller in comparison with the case of stacking unit cells, each being fastened using metal fastening members.

Additionally, in the present embodiment, a pair of the pin insertion holes 63a and 63b is provided in each fastening base 62 of the anode separator 55, and a pair of the pin insertion holes 64a and 64b is provided in each fastening base 62 of the cathode separator 56. When the A-type unit cell 50A is assembled, every cell fastening pin 10 is inserted into the A-side pin insertion holes 63a and 64a, and when the B-type unit cell 50B is assembled, every cell fastening pin 10 is inserted into the B-side pin insertion holes 63b and 64b. Therefore, each of the anode and the cathode separators 55 and 56 can be a common part in either type of the unit cells 50A and 50B. Accordingly, the kinds of parts can be reduced and the parts can be easily managed, thereby improving productivity.

Figure 10:
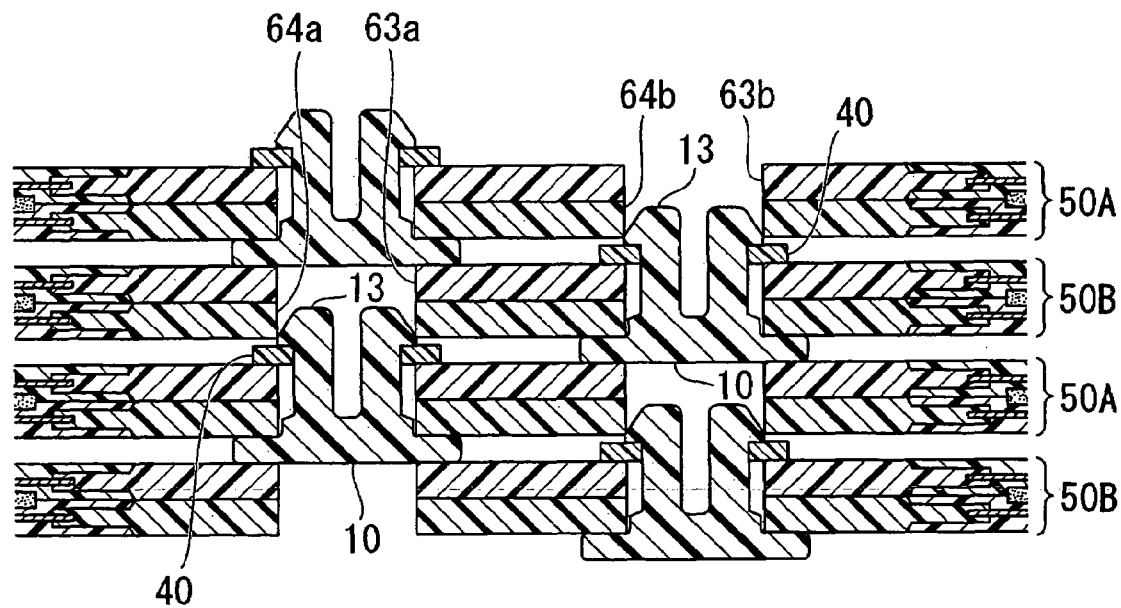
FIG. 10 is a sectional view showing fastened portions in a fuel cell stack consisting of the stacked unit cells in another embodiment.

FIG. 10 is a sectional view showing fastened portions in a fuel cell stack consisting of the stacked unit cells 50 in a variation of the present embodiment. As shown in FIG. 10, all the diameters of the pin insertion holes 63a and 63b of the anode separator 55 and of the pin insertion holes 64a and 64b of the cathode separator 56 can be the same, and the hook portions 13 of each cell fastening pin 10 can be fit to the anode separator 55 via a washer 40.

Other Embodiments

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the number and the positions of the fastening bases 62 in each of the separators 55 and 56 are not limited to those specified in the above embodiment. The shape of the cell fastening pin 10 is also not limited to that specified in the above embodiment. For example, the smaller-diameter portion 11b may be divided into two portions in the circumferential direction, instead of the four portions in the above embodiment.

Additionally, in the above embodiment, the cathode separator 56 is the first separator of the present invention, and the anode separator 55 is the second separator of the present invention. However, the opposite arrangement is possible. That is, the anode separator 55 and the cathode separator 56 may be respectively the first separator and the second separator. In this case, the inner diameters of the pin insertion holes 63a and 63b of the anode separator 55 are set to be larger than the inner diameters of the pin insertion holes 64a and 64b of the cathode separator 56, and each cell fastening pin 10 is inserted from the anode separator 55 side, and the flange portion 12 of the cell fastening pin 10 is fit to a surface of the anode separator 55.

What is claimed is:

1. A fuel cell comprising a unit cell component, wherein:
   in the unit cell component including separators, a membrane electrode assembly, in which a pair of electrodes are provided on either side of an electrolyte membrane, is provided between each separator and the separator adjacent thereto;
   pin insertion holes are respectively provided in a plurality of portions in an outer periphery of each of the separators, and the pin insertion holes of the separators are respectively coaxial with each other;
   a leg portion of a cell fastening pin made of resin is inserted through each set of the coaxial pin insertion holes of the separators;
   the unit cell component is fastened by fitting a flange portion formed at an end of the leg portion to one of the outermost separators, and fitting a hook portion formed at the other end of the leg portion to the other of the outermost separators;
   the fuel cell has a pair of the unit cell components which are stacked, where the cell fastening pins mounted into one of the unit cell components are arranged at positions different from positions where the cell fastening pins mounted into the other unit cell component are arranged;
   the pin insertion holes of said one of the outermost separators have diameters larger than diameters of the corresponding pin insertion holes of the other of the outermost separators; and
   the leg portion of each cell fastening pin has a larger-diameter portion having a larger diameter than a remaining portion, where the larger-diameter portion is formed next to the flange portion and is contained in the corresponding pin insertion hole of said one of the outermost separators, through which the cell fastening pin is inserted.

2. The fuel cell according to claim 1, wherein:

for each insertion hole of each separator, another pin insertion hole having the same form is provided so as to form a pair of the pin insertion holes;

in one of the unit cells, each cell fastening pin is mounted into the pin insertion hole on one side of each pair, and in the other unit cell, each cell fastening pin is mounted into the pin insertion hole on the other side of each pair.

3. The fuel cell according to claim 1, wherein:

the leg portion of each cell fastening pin is divided into a plurality of leg sections in a circumferential direction of the leg portion; and the hook portion is also divided into a plurality of portions, each provided at an end of each leg section.

4. A cell fastening pin used in the fuel cell according to any one of claims 1 and 2, comprising:

a pin main portion including the leg portion, the flange portion, and the hook portion; and a handle joined to the flange portion.

5. A cell fastening pin according to claim 4, wherein:

the cell fastening pin is formed by injection molding;

the handle includes a gate portion which is joined to the flange portion; and after the unit cell is fastened, the handle and the pin main portion are cut off at the gate portion.

6. A cell fastening pin according to claim 5, wherein the gate portion has a diameter smaller than diameters of the flange portion and the other portions of the handle.

* * * * *